(12) United States Patent
Graham

(10) Patent No.: US 6,550,359 B1
(45) Date of Patent: Apr. 22, 2003

(54) DEVICE AND METHOD FOR DRIVING A PART

(76) Inventor: S. Neal Graham, 12997 Fawns Ridge, Fishers, IN (US) 46038

( * ) Notice: Subject to any disclaimer, the term of this patent is extended or adjusted under 35 U.S.C. 154(b) by 312 days.

(21) Appl. No.: 09/629,549

(22) Filed: Jul. 31, 2000

(51) Int. Cl.$^7$ .............................................. B25B 23/06
(52) U.S. Cl. ...................................... 81/431; 81/57.37
(58) Field of Search ................................ 81/57.37, 431, 81/433

(56) References Cited

U.S. PATENT DOCUMENTS

| | | | |
|---|---|---|---|
| 2,953,049 A | * 9/1960 | Vilmerding | 81/57.37 |
| 2,973,021 A | 2/1961 | Crossen | 144/32 |
| 3,283,791 A | 11/1966 | Weber | 144/32 |
| 3,314,458 A | 4/1967 | Weber | 144/32 |
| 3,918,533 A | 11/1975 | Weber | 173/155 |
| 4,114,663 A | 9/1978 | Viner | 144/32 |
| 4,204,439 A | 5/1980 | Kondo | 81/57.37 |
| 4,671,143 A | 6/1987 | Heck et al. | 81/431 |
| 4,705,201 A | 11/1987 | Bennett | 227/55 |
| 4,862,774 A | 9/1989 | Else et al. | 81/57.37 |
| 5,031,489 A | * 7/1991 | Young et al. | 81/57.37 |
| 5,088,359 A | 2/1992 | Hockman | 81/57.37 |
| 5,186,084 A | 2/1993 | Totsu | 81/431 |
| 6,341,542 B1 | * 1/2002 | Ade et al. | 81/433 |

* cited by examiner

Primary Examiner—James G. Smith
(74) Attorney, Agent, or Firm—Woodard, Emhardt, Naughton, Moriarty & McNett LLP (57) ABSTRACT

A device for driving a part, including a parts driver having a drive axis and a nosepiece including three jaws arranged uniformly about the drive axis and defining an axial drive passage therebetween. The jaws are resiliently biased toward one another and are transitionable between a first configuration to retain the part within the drive passage and a second configuration to allow the part to be discharged from the drive passage by the parts driver. An adjacent pair of the jaws defines a transverse parts feed passage intersecting the drive passage and being oriented at an oblique angle relative to the drive axis. Each of the adjacent pair of jaws defines a substantially symmetrical portion of the feed passage. A parts delivery conduit is pivotally coupled to the nosepiece and includes an end portion pivotable between a first position in which the end portion extends into the drive passage to aid in guiding the part into the drive passage and a second position in which the end portion is displaced away from the drive axis. The parts delivery conduit also includes a stationary end portion that is disposed proximately adjacent the pivotable end portion. The stationary and pivotable end portions define a substantially continuous parts delivery flowpath when the pivotable end portion is in the first position.

39 Claims, 6 Drawing Sheets

DEVICE AND METHOD FOR DRIVING A PART

FIELD OF THE INVENTION

The present invention generally relates to devices for driving parts, and more particularly relates to devices for automatically delivering fasteners, one-at-a-time, to the nosepiece of a driving device and automatically engaging each fastener to a work piece.

BACKGROUND OF THE INVENTION

Systems for orienting fasteners, such as screws, bolts, nuts or rivets, from a bulk form into an arrangement whereby the fasteners are aligned and individually transported to an automatic driving device are well known. Generally, such systems include a feeder device which draws fasteners-from a reservoir of disoriented fasteners disposed within a hopper and orients the fasteners to a pre-determined orientation. Such feeder devices may include vibratory parts feeder machinery, an example of which is disclosed in U.S. Pat. No. 5,630,497 to Graham. The oriented parts are transported, one at a time, to an automatic driving device where each fastener is driven into engagement with a work piece. The primary purpose of such systems is to automate production and/or reduce cycle times.

Generally, the fasteners are supplied to the driving device through a flexible delivery tube. The flexible tube supplies individual fasteners to a parts discharge passage defined axially through the nosepiece of the driving device. Typically, the flexible tube is placed in communication with an intermediate feed passage formed integral with the nosepiece and intersecting the discharge passage in an inclined manner. Since the walls of the integrally formed feed passage do not extend into the drive passage, the fasteners have a tendency to tumble and become cocked or jammed within the nosepiece at the angular transition between the feed passage and the discharge passage. Because of this tendency for the fasteners to tumble, the use of prior devices has typically been limited to fasteners having overall lengths significantly greater than their overall widths. Specifically, fasteners having a relatively large length-to-width aspect ratio are less likely to tumble and become jammed in the nosepiece of the device. With prior devices, a minimum aspect ratio greater than 1.5:1 is typically required to reduce the likelihood of jamming.

Since increasing the speed of production is one of the main objectives of an automatic driving device, jamming or malfunctioning of the device is a major drawback. Such jams or malfunctions usually result in a work stoppage, potentially causing a complete shutdown of production or, at a minimum, a slowdown in production. In the event that a fastener should become cocked or jammed, the nosepiece of the device should preferably have the ability to be quickly cleared to regain use of the device and minimize downtime. In some cases, the nosepiece of prior driving devices must be completely disassembled to clear a jammed fastener, thus resulting in a potentially lengthy shutdown of production.

Additionally, existing driving devices are unnecessarily complicated, typically having a relatively large number of intricate parts that are prone to jamming. Existing driving devices are also difficult to clear in the event of jamming and are difficult to disassemble for servicing. Hence, there has been a need for a parts feeding and driving device which addresses some or all of the drawbacks discussed above with regard to prior devices. An effective means for satisfying this need has escaped those skilled in the art. The present invention satisfies this need in a novel and unobvious way.

SUMMARY OF THE INVENTION

In one form of the present invention, a device is provided for driving a part, generally comprising a parts driver, a parts receiver and a parts delivery conduit. The parts receiver includes a plurality of retaining elements defining a first passage therebetween and being transitionable between a first configuration to retain the part within the first passage and a second configuration to allow the part to be discharged therefrom. The parts receiver also defines a second passage extending transversely therethrough and intersecting the first passage. The parts delivery conduit is at least partially disposed within the second passage and includes an end portion extending into the first passage to guide the part into the first passage.

In another form of the present invention, a device is provided for driving a part, generally comprising a parts driver, a nosepiece and a parts delivery conduit. The nosepiece includes at least three jaws defining an axial passage therebetween and being transitionable between a first configuration to retain the part within the axial passage and a second configuration to allow the part to be discharged therefrom. An adjacent pair of the jaws defines a transverse passage intersecting the axial passage. The parts delivery conduit is positioned in communication with the transverse passage to deliver the part through the transverse passage and into the axial passage.

In a further form of the present invention, a device is provided for driving a part, generally comprising a parts driver, a parts receiver and a parts delivery conduit. The parts receiver defines an axial passage and a transverse passage intersecting the drive passage. The parts delivery conduit includes a movable portion and a stationary portion. The movable portion is displaceable between a first position in which the movable portion is positioned in communication with the transverse passage to deliver the part through the transverse passage and into the axial passage and a second position in which the movable portion is displaced in an outward, transverse direction. The stationary portion is disposed proximately adjacent the movable portion to define a substantially continuous parts delivery flowpath when the movable portion is in the first position.

In yet another form of the present invention, a device is provided for driving a part into engagement with a work piece. The device comprises means for receiving the part, including at least three jaws defining an axial parts drive passage, with an adjacent pair of the jaws defining a parts inlet passage therebetween in communication with the drive passage. The device further comprises means for biasing the jaws toward one another to enable the jaws to selectively retain the part within the drive passage in a drive position, and means for delivering the part through the inlet passage and into the drive passage. The delivering means includes means for guiding the-part into the drive passage, with the guiding means being pivotable between a first position in which an end portion of the guiding means is at least partially disposed within the drive passage and a second position in which the end portion is pivoted in an outward direction transverse to the drive axis. The device additionally comprises means for driving the part from the drive passage and into engagement with the work piece.

In still another form of the present invention, a method is provided for driving a part having a head and an internally threaded shank into engagement within an opening in a work piece. The method comprises: a.) providing a parts driver having a drive shaft extending along a drive axis and defining a threaded portion engageable with the internally threaded shank, with the parts: driver being adapted to displace the drive shaft generally along the drive axis and to rotate the drive shaft about the drive axis, and a receiver defining an axial passage extending generally along the drive axis and opening onto a distal end of the receiver; b.) delivering a part into the axial passage with the shank extending toward the distal end of the receiver; c.) engaging the drive shaft to the part; d.) discharging the part from the axial passage and positioning the head of the part beyond the distal end of the receiver by displacing the drive shaft in a first axial direction; e.) compressing the head of the part against the distal end of the receiver by displacing the drive shaft in a second axial direction generally opposite the first axial direction to substantially prevent rotation of the part about the drive axis relative to the receiver; f.) positioning the shank of the part within the opening in the work piece; and g.) threading the threaded portion of the drive shaft along the internally threaded shank by rotating the drive shaft about the drive axis in a first rotational direction, the threading causing a portion of the shank to buckle, the work piece being securely engaged between the head and the buckled portion of the shank.

One object of the present invention is to provide a unique device and method for driving a part.

Related objects and advantages of the present invention will become apparent from the following illustrations and description.

BRIEF DESCRIPTION OF THE DRAWINGS

FIG. 2b is a distal end view of the part shown in FIG. 2a.

FIG. 2c is a cross sectional view of the part shown in FIG. 2a.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is hereby intended, such alterations and further modifications in the illustrated device, and such further applications of the principles of the invention as illustrated herein being contemplated as would normally occur to one skilled in the art to which the invention relates.

Figure 1:
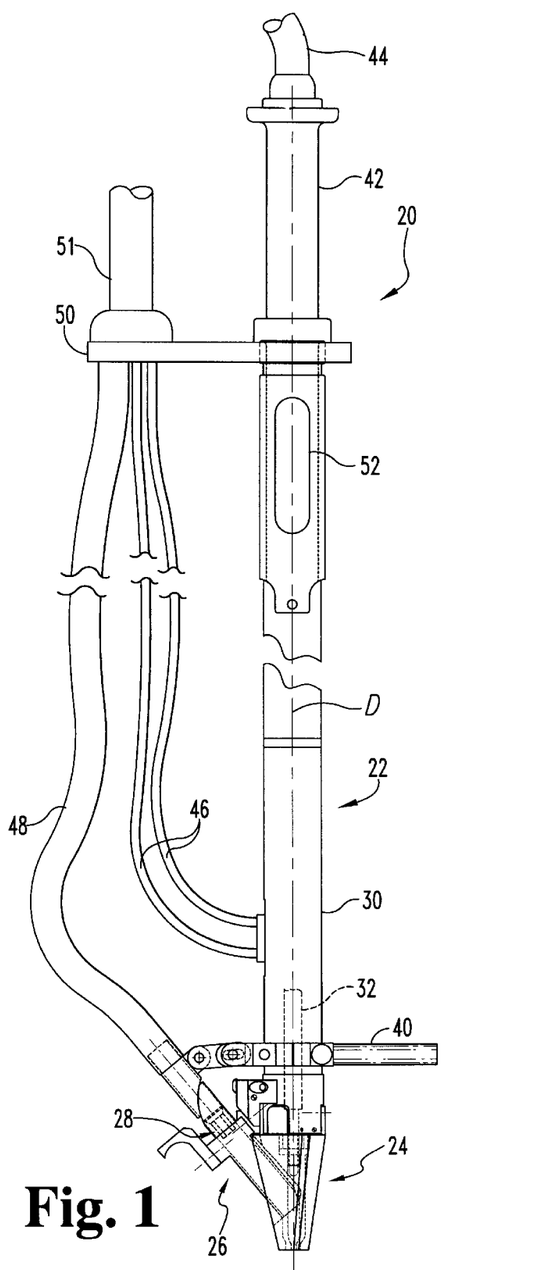
FIG. 1 is a partial side elevation-view of an automatic fastener feeding and driving device according to one embodiment of the present invention.

Referring to FIG. 1, shown therein is an automatic parts driving device 20 according to one embodiment of the present invention. Parts driving device 20 generally comprises a parts driver 22, a parts receiver or nosepiece 24, and a parts delivery conduit 26. As will be discussed in further detail below, a part 28 is automatically fed into the parts delivery conduit 26, which in turn directs the part 28 into the receiver 24. Once the part 28 is properly positioned in the receiver 24, the driver 22 is activated to automatically drive part 28 into engagement with a work piece.

Driver 22 is positioned along a drive axis D and includes a generally tubular outer housing 30 that encloses a rotary drive motor (not shown) and a linear actuator (not shown). A mandrel 32 is rotatably and axially coupled to the drive motor. In one embodiment of driver 22, the drive motor is electrically powered and is adapted to rotate the mandrel 32 generally about the drive axis D. However, it should be understood that the drive motor could alternatively be pneumatically powered or powered by any other means known to those of skill in the art. Preferably, the drive motor is reversible, capable of rotating the mandrel 32 in both clockwise and counterclockwise directions. In one embodiment of driver 22, the linear actuator is pneumatically powered and is adapted to displace the mandrel 32 generally along the drive axis D. However,-it should be understood that the linear actuator could alternatively be electrically powered or powered by any other means known to those of skill in the art. Preferably, the linear actuator is reversible, capable of reciprocally displacing the mandrel 32 in opposite axial directions.

The parts driving device 20 includes a lower handle 40 extending transversely from housing 30 and an upper handle 42 extending axially from housing 30 to aid in manually manipulating the device 20 into a desired operational position. The electrical wiring associated with driver 22 is preferably consolidated within a single cable 44, entering driver 22 through upper handle 42. The pneumatic tubing 46 associated with the linear actuator and a flexible parts delivery tube 48 placed in communication with the delivery conduit 26 are preferably routed through a tubing harness 50 attached to housing 30. The tubing 46 and the tube 48 are preferably consolidated within a single tube or sheath 51 attached to an upper surface of tubing harness 50. The driver 22 is preferably controlled by a manual trigger 52; however, it should be understood that the driver 22 could alternatively be automatically controlled at a remote location by any suitable means. Further details regarding the general structure and operation of the driver 22 are well known to those skilled in the art, and are therefore deemed unnecessary for a full understanding of the principles of the present invention.

Figure 2A:
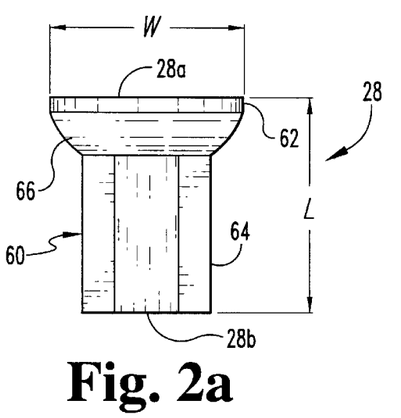
FIG. 2a is a side elevation view of one embodiment of a part for use with the device shown in FIG. 1.
Figure 2B:
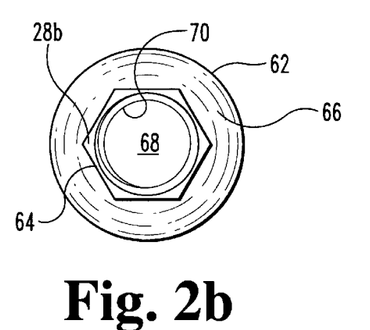
Figure 2C:
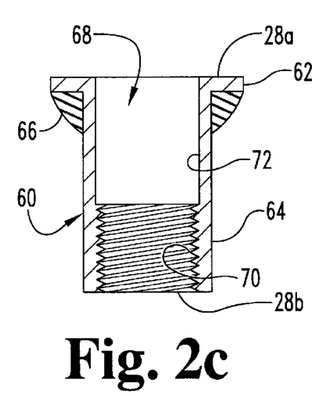

Referring to FIGS. 2a—2c, shown therein is one embodiment of a part 28 for use with the device 20. In the illustrated embodiment, part 28 is a fastener, and more specifically a rivnut. The rivnut 28 has a body 60 comprising a head 62 and a shank 64, and includes gasket seal 66 disposed about shank 64 and positioned adjacent head 62. As shown in the illustrated embodiment, the head 62 preferably has a flat, circular shape, and the shank 64 preferably has an elongated, hexagonal shape. The rivnut 28 has an overall length L, as measured between end 28a of head 62 and end 28b of shank 64, and a maximum width W, as measured at the outer diameter of head 62. As will be discussed in further detail below, one advantage of the parts driving device 20 over prior devices is that device 20 is capable of accommodating parts 28 having a length-to-width (L:W) aspect ratio R of between about 1.5:1 to 1.1:1. Rivnut 28 includes an opening 68 extending from end 28a toward end 28b, preferably extending the entire length of rivnut 28 so as to define a tubular or cylindrical shaped part. Opening 68 defines an internally threaded portion 70 and an unthreaded, relatively thin walled portion 72 disposed between the head 62 and the threaded portion 70, the importance of which will become apparent below.

The body 60 of rivnut 28 is preferably made of metal, such as, for example, zinc plated steel, or any other material known to those of skill in the art. The gasket 66 is preferably made of an elastomeric material, such as, for example, rubber, or any other material known to those of skill in the art. Although part 28 has been illustrated and described as a rivnut, it should be understood that other types of parts are also contemplated as being used in association with the parts driving device 20, such as, for example, screws, rivets, pins, inserts, or other types of parts which would occur to one of ordinary skill in the art. Additionally, although rivnut 28 has been illustrated and described as having a specific shape and configuration, other shapes and configurations are also contemplated as would occur to one of ordinary skill in the art.

Referring now to FIGS. 3–8, shown therein are various details of the distal end portion of device 20. The mandrel 32 includes a main body 78 and a drive shaft 80 extending from main body 78 generally along drive axis D. Drive shaft 80 defines external threads 82 and a rounded distal end portion 84. The external threads 82 correspond to the internally threaded portion 70 of shank 64 to enable the drive shaft 80 to engage rivnut 28 in threaded relation. In one embodiment, the external threads 82 and the internally threaded portion 70 each define M6×1 threads; however, it should be understood that other thread sizes are also contemplated as being within the scope of the invention. The rounded end portion 84 serves to facilitate the insertion of drive shaft 90 within opening 68 and the threading engagement between the external threads 82 of drive shaft 80 and the internally threaded portion 70 of part 28.

Figures 3, 4:
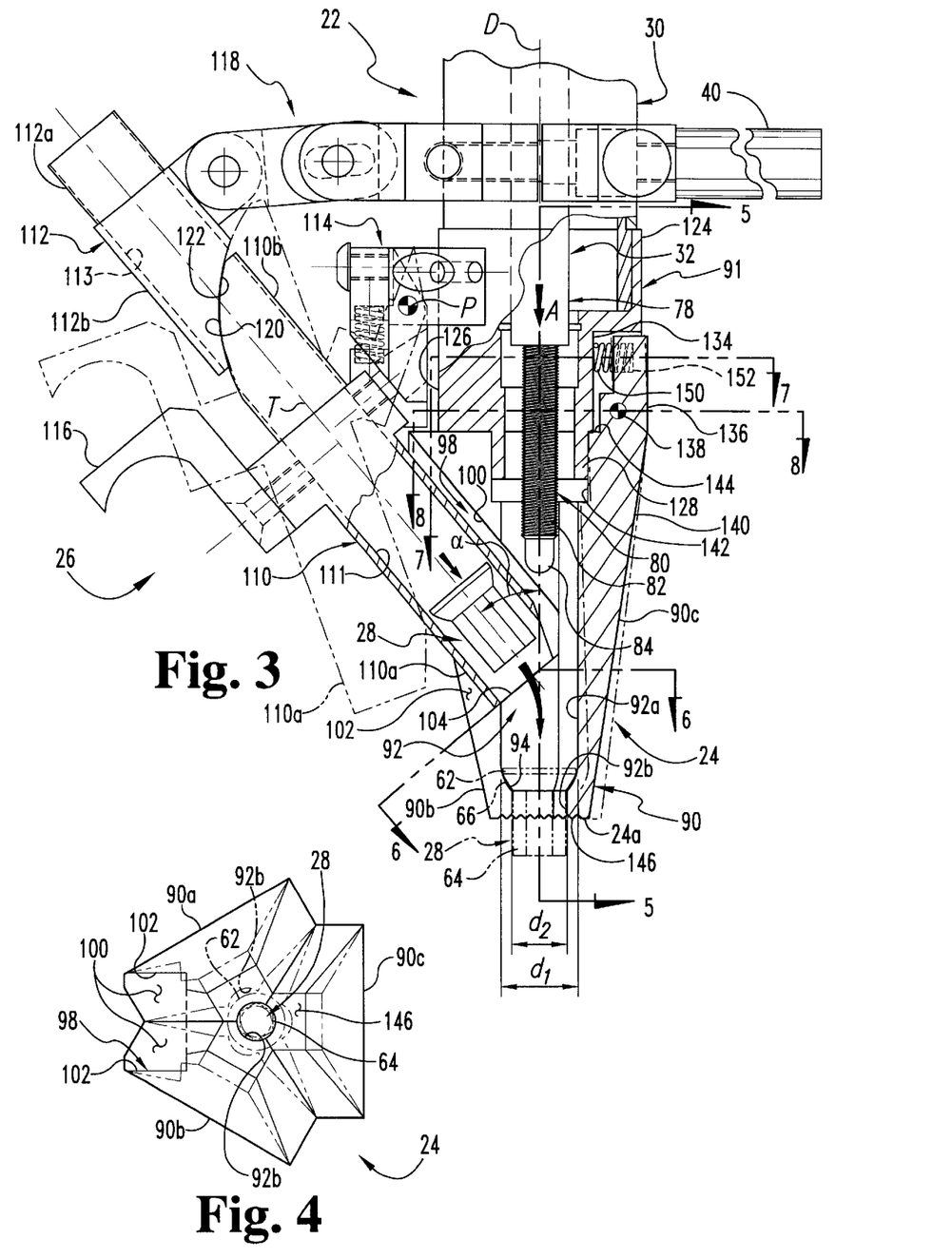
FIG. 3 is a partial cross sectional view of the distal end portion of the device shown in FIG. 1, illustrating a parts receiver according to one embodiment of the present invention.
FIG. 4 is a bottom view of the parts receiver shown in FIG. 3.
Figure 5:
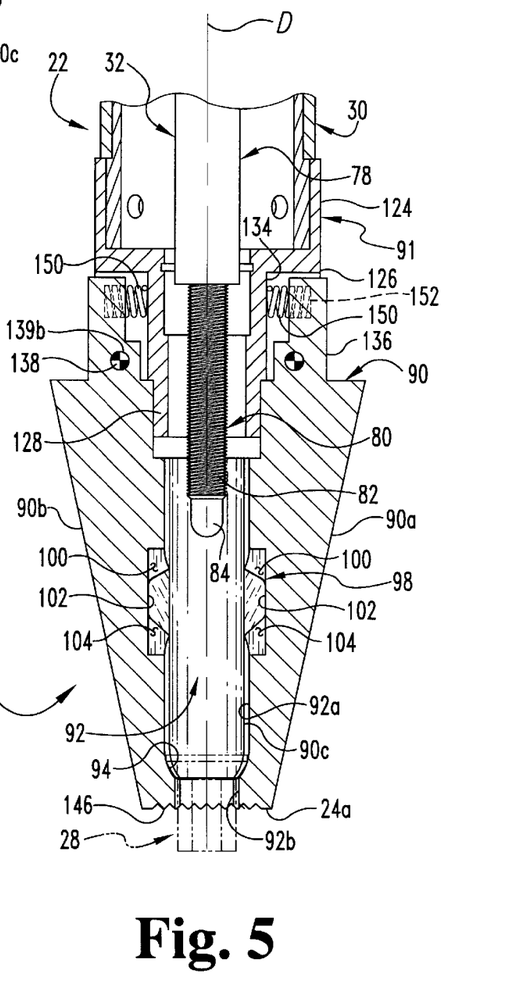
FIG. 5 is a cross sectional view of the parts receiver shown in FIG. 3, taken along line 5—5 of FIG. 3.
Figure 6:
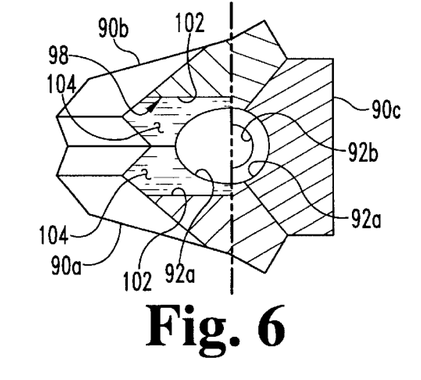
FIG. 6 is a cross sectional view of the parts receiver shown in FIG. 3, taken along line 6—6 of FIG. 3.

The nosepiece 24 generally includes a plurality of retaining elements or jaws 90, arranged about the drive axis D and operatively coupled to support member 91. Support member 91 is in turn operatively attached to the outer housing 30. In a preferred embodiment, nosepiece 24 includes three jaws 90a, 90b, 90c arranged substantially uniformly about drive axis D. However, it should be understood that nosepiece 24 could alternatively include a pair of opposing jaws 90, or any number of jaws arranged about drive axis D.

The three jaws 90a, 90b, 90c cooperate to define an axial drive passage 92, preferably having a generally circular cross section; however, other shapes and configurations of axial passage 92 are also contemplated as would occur to one of ordinary skill in the art. Axial passage 92 includes a first axial portion 92a extending along a substantial length of jaws 90 and a second axial portion 92b opening onto the distal end 24a of the nosepiece 24. Axial portion 92a has an inner diameter $d_1$ sized somewhat larger than the outer diameter of the head 62 of rivnut 28. Axial portion 92b has an inner diameter $d_2$ sized somewhat larger than the maximum outer cross section of the shank 64, but somewhat smaller than the outer diameter of the head 62. A chamfered portion 94 is positioned between axial portions 92a, 92b to provide a smooth transition between inner diameters $d_1$, $d_2$. Thus, when the jaws 90 are in the configuration illustrated in FIG. 3, the rivnut 28 is permitted to pass axially through axial portion 92a until the gasket seal 66 abuts chamfered portion 94 to retain the rivnut within axial passage 92, with the shank 64 extending through the axial portion 92b.

The nosepiece 24 defines a transverse inlet passage 98 extending laterally therethrough along a transverse axis T (FIG. 3) and intersecting axial drive passage 92 at an angle α to thereby place transverse passage 98 in communication with axial passage 92. In one embodiment of the present invention, angle α is an oblique angle of about 40°. However, it should be understood that angle α may alternatively take on other values as would occur to one of ordinary skill, in the art, including a 90° angle. In the illustrated embodiment, the transverse passage 98 has a square or rectilinear configuration, bounded by substantially perpendicular sidewalls 100, 102 and a bottom wall 104 (FIGS. 3–6). However, it should be understood that transverse passage 98 may take on other shapes and configurations as would occur to one of ordinary skill in the art, such as, for example, a substantially circular configuration.

The transverse passage 98 is preferably defined between an adjacent pair of jaws 90a, 90b. Additionally, each of the pair of jaws 90a, 90b preferably defines substantially symmetrical portions of transverse passage 98, with the remaining jaw 90c being arranged generally opposite transverse passage 98. In this manner, a rivnut 28 introduced into the axial passage 92 will collide directly against the portion of the axial passage 92 defined by jaw 90c. Because rivnut 28 impacts against a relatively smooth surface, the tendency of rivnut 28 to tumble upon entry into axial passage 92 and become cocked or jammed within the nosepiece 24 is thereby reduced. Such would not be the case if, for example, the transverse passage 98 were positioned generally opposite a point of intersection between an adjacent pair of jaws. Specifically, the seam created by the abutting surfaces of an adjacent pair of jaws may create enough of a discontinuity within axial passage 92 to cause rivnut 28 to tumble and become cocked or jammed within the nosepiece 24. An additional benefit of having a single jaw 90c arranged generally opposite transverse passage 98 is that should jaw 90c become damaged or worn by the repeated impact of rivnuts 28 thereon, only a single jaw would require replacement rather than having to replace two or more jaws.

Referring to FIG. 3, the parts delivery conduit 26 generally includes a movable portion 110 defining a first parts delivery flowpath 111, and a stationary portion 112 defining a second parts delivery flowpath 113. Preferably, flowpaths 111, 113 each have a generally circular configuration, each being sized somewhat larger than the outer diameter of the head 62 of rivnut 28. Additionally, movable and stationary portions 110, 112 each preferably have a square or rectilinear outer cross section substantially corresponding to the shape of the transverse passage 98. However, it should be understood that other shapes and configurations of movable and stationary portions 110, 112 and flowpaths 111, 113 are also contemplated as would occur to one of ordinary skill in the art.

The movable portion 110 is pivotally connected to the support member 91 by a pivoting mechanism 114 to allow pivotal movement between a first operational position (shown in solid lines) and a second operational position (shown in phantom lines), the details of which will be described below. Movable portion 110 includes a handle 116 to facilitate manual manipulation between the first and second operational positions. When in the first operational position (solid lines), movable portion 110 is positioned in communication with the transverse passage 98, with at least a portion of movable portion 110 extending through transverse passage 98, to deliver the rivnut 28 through the transverse passage 98 and into the axial passage 92.

Figure 10:
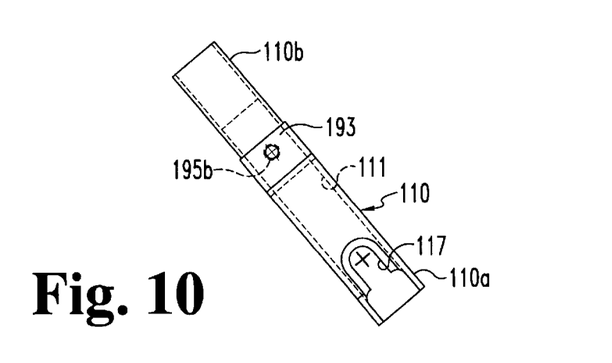
FIG. 10 is a top view of the pivotal portion of the parts delivery conduit shown in FIG. 9, taken along line 10—10 of FIG. 9.

As shown in the illustrated embodiment, a distal end portion 110a of movable portion 110 preferably extends transversely into the axial passage 92 to aid in guiding the rivnut 28 through the angular transition between flowpath 111 and axial passage 92. The distal end portion 110a preferably defines a transverse passageway 117 (FIG. 10), sized to allow passage of the drive shaft 80 therethrough when movable end portion 110 is in the first operational position. Because of the configuration of end portion 110a and its disposition within axial passage 92, the tendency of the rivnut 28 to tumble upon entry into the axial passage 92 and become cocked or jammed within the nosepiece 24 is significantly reduced, especially in cases where the rivnut 28 has a length-to-width aspect ratio R of less than 1.5:1 and/or is top heavy. A part is considered top heavy if its center of gravity is significantly closer to head 62 than to the free end 28b of shank 64.

When the movable portion 110 is pivoted toward the second operational position (phantom lines), the distal end portion 110a is displaced in an outward direction, away from the drive axis D. In a preferred embodiment, the distal end portion 110a swings clear of the transverse passage 98 when the movable portion 110 is pivoted toward the second operational position. In this manner, access to the interior of the nosepiece 24 is quickly and readily accessible in the event that a rivnut 28 should become cocked or jammed, thus allowing for prompt clearing of the nosepiece 24 to regain immediate use of the driving device 20 and minimize downtime. Although movable end portion 110 has been illustrated and described as being pivotally displaceable relative to nosepiece 24, it should be understood that movable end portion 110 could alternatively be configured for lateral, axial or rotational displacement relative to the drive axis D between first and second operational positions.

The stationary portion 112 is coupled to the outer housing 30 and is adjustably positionable relative to movable portion 110 by a linkage mechanism 118, the details of which will be described below. Stationary end portion 112 includes a parts inlet end 112a and a parts outlet end 112b. The parts inlet end 112a is adapted to connect to the flexible parts delivery tube 48 (as shown in FIG. 1). More specifically, end 112a defines an outer diameter approximately equal to the inner diameter of the flexible tube 48 to permit tube 48 to slip over end 112a. In another embodiment of stationary portion 112, end 112a may include a frictional surface, such as a series of radial projections extending circumferentially about end 112a, adapted to grip tube 48 and prevent tube 48 from becoming detached from stationary portion 112.

The parts outlet end 112b of stationary portion 112 is disposed adjacent the proximal end 110b of movable portion 110. When the movable end portion 110 is in the first operational position (solid lines), end 110b is disposed in close proximity to end 112b, with parts flowpaths 111, 113 aligned generally along transverse axis T to define a substantially continuous parts delivery flowpath. More specifically, the proximal end 110b of movable portion 110 defines a peripheral edge 120 and the parts outlet end 112b of stationary portion 112 defines a peripheral edge 122 substantially complementary to peripheral edge 120. As shown in the illustrated embodiment, peripheral edge 120 preferably has a convex, arcuate shape and peripheral edge 122 preferably has a concave, arcuate shape. Each edge 120, 122 is configured so that when the movable end portion 110 is in the first operational position (solid lines), the edges 120, 122 are positioned is close proximity, while avoiding interference between edges 120, 122 when the movable end portion 110 is pivoted toward the second operational position (phantom lines). Although peripheral edges 120, 122 are illustrated as having a specific shape and configuration, it should be understood that other shapes and configurations are also contemplated as would occur to one of ordinary skill in the art, such as, for example, each of the edges 120, 122 having substantially complementary angular configuration.

Referring collectively to FIGS. 3–8, shown therein are further details regarding nosepiece 24. Each of the jaws 90a, 90b, 90c are pivotally connected to support member 91 in a manner which permits jaws 90a, 90b, 90c to swing freely toward and away from one another. In turn, support member 91 is operatively coupled to the outer housing 30. Support member 91 includes an upper cylindrical section 124, a midsection 126, and a lower cylindrical section 128. The upper cylindrical section 124 is positioned over a lower portion of outer housing 30 and is attached thereto by a number of fasteners (not shown).

Figure 7:
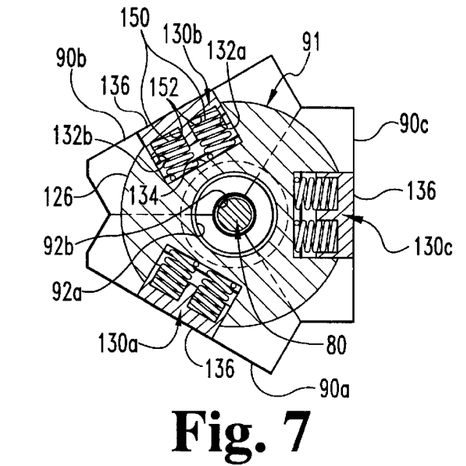
FIG. 7 is a cross sectional view of the parts receiver shown in FIG. 3, taken along line 7—7 of FIG. 3.
Figure 8:
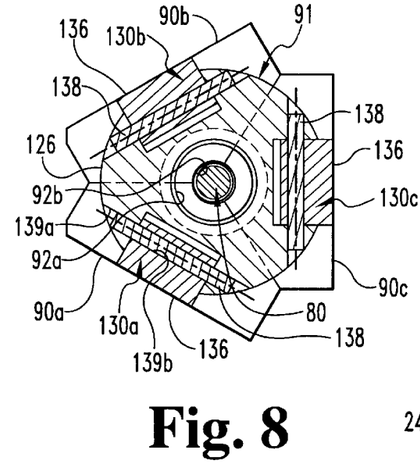
FIG. 8 is a cross sectional view of the parts receiver shown in FIG. 3, taken along line 8—8 of FIG. 3.

As most clearly shown in FIGS. 7 and 8, the midsection 126 defines three recesses 130a, 130b, 130c, each including a pair of opposing transverse side walls 132a, 132b and an inner axial wall 134. Each jaw is pivotally coupled to support member 91 by positioning an upper portion 136 of each jaw within a corresponding recess 130a, 130b, 130c of support member 91 and passing a pin 138 through a corresponding opening 139a in midsection 126 and an opening 139b in upper portion 136. Referring once again to FIG. 3, the main body portion 140 of each jaw defines an axial recess 142, extending downwardly from an upper surface 144 thereof and positioned in communication with axial passage 92. The lower cylindrical section 128 of support member 91 is disposed within the axial recess 142 and acts as a positioning mechanism to limit the inward pivotal movement of jaws 90a, 90b, 90c relative to support member 91.

As shown in FIGS. 3 and 4, jaws 90a, 90b, 90c are pivotally displaceable between an inwardly biased first configuration (shown in solid lines) and an outwardly displaced second configuration (shown in phantom lines). When in the first configuration, the rivnut 28 is selectively retained within the axial passage 92, with the side wall of head 62 positioned adjacent axial portion 92a and with the shank 64 extending through axial portion 92b. However, when in the second configuration, each jaw 90a, 90b, 90c is pivoted in an outward direction to permit the rivnut head 62 to be axially displaced through axial portion 92b, thereby allowing rivnut 28 to be selectively discharged from the distal end 24a of nosepiece 24. In a preferred embodiment of the invention, as rivnut 28 is displaced axially through axial passage 92, it is the direct engagement between the side wall of head 62 and the axial portion 92b which acts to pivotally displace the jaws 90a, 90b, 90c from the first configuration to the second configuration. Additionally, the distal ends of each jaw 90a, 90b, 90c preferably define an engaging surface 146 adapted to engage the upper surface of the rivnut head 62, the importance of which will become apparent below. In one embodiment, the engaging surface 146 is knurled to provide a means for frictionally engaging the upper surface of the rivnut head 62.

As shown in FIG. 7, each of the jaws 90a, 90b, 90c are inwardly biased toward the first configuration by at least one resilient member 150 disposed between the upper portion 136 of each jaw and the support member 91. In a preferred embodiment, jaws 90a, 90b, 90care inwardly biased toward the first configuration by a pair of resilient members 150. Each resilient member 150 is partially disposed within a corresponding spring pocket 152 defined in upper portion 136 and placed in abutment against the axial wall 134 of a corresponding recess 130a, 130b, 130c in midsection 126. However, it should be understood that any number of resilient members may be used to inwardly bias each jaw toward the first configuration, including a single resilient member.

Once rivnut 28 is completely discharged from nosepiece 24, jaws 90a, 90b, 90c will return toward their first configuration by way of the outward biasing force exerted on upper portions 136 by resilient members 150. As discussed above, the lower cylindrical section 128 of support member 91 serves to limit the inward pivotal movement of jaws 90a, 90b, 90c to accurately position the jaws in the first configuration for receiving another rivnut 28. In a preferred embodiment, the resilient member 150 is a coil spring; however other types of resilient members or other configurations of springs are also contemplated as being within the scope of the invention. For example, spring 150 could be replaced with any structure which is capable of being elastically deformed upon the imposition of a force, and returning toward an undeformed state upon release of that force.

Figure 9:
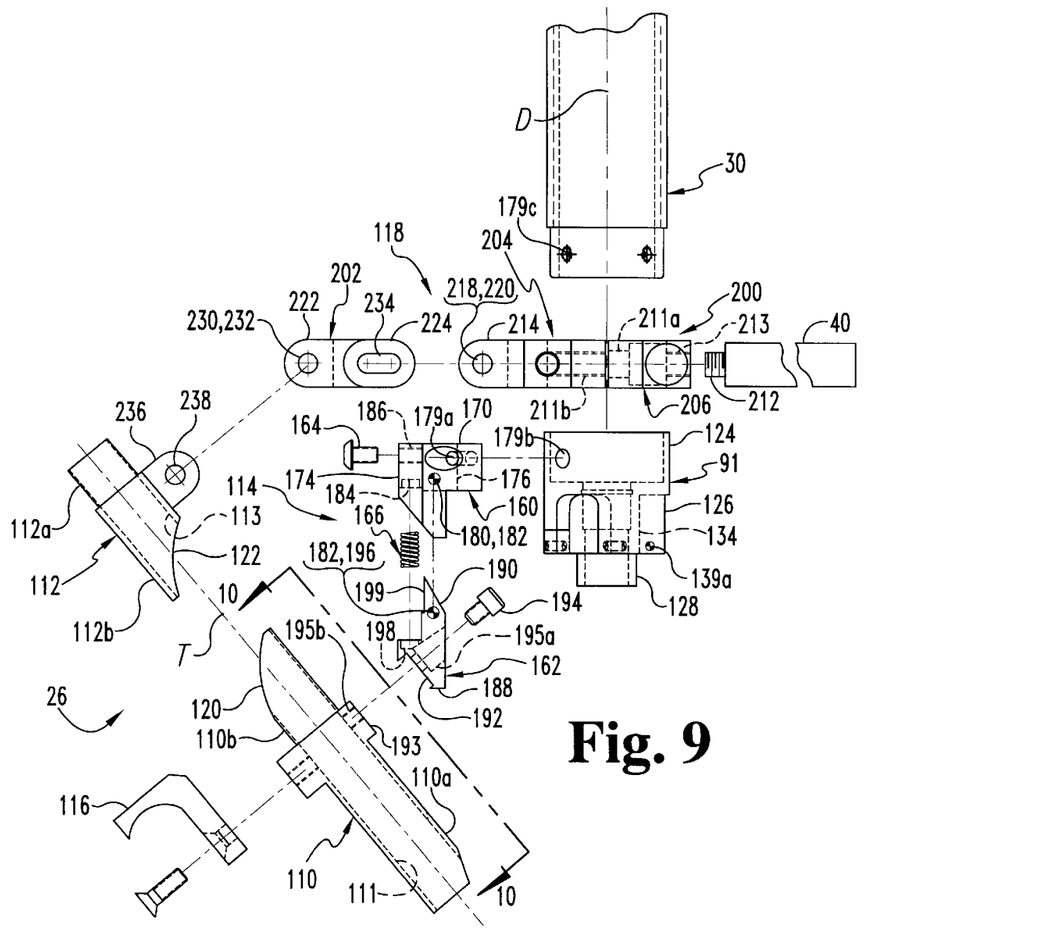
FIG. 9 is a partially exploded side elevation view of a portion of the parts receiver shown in FIG. 3.
Figure 11:
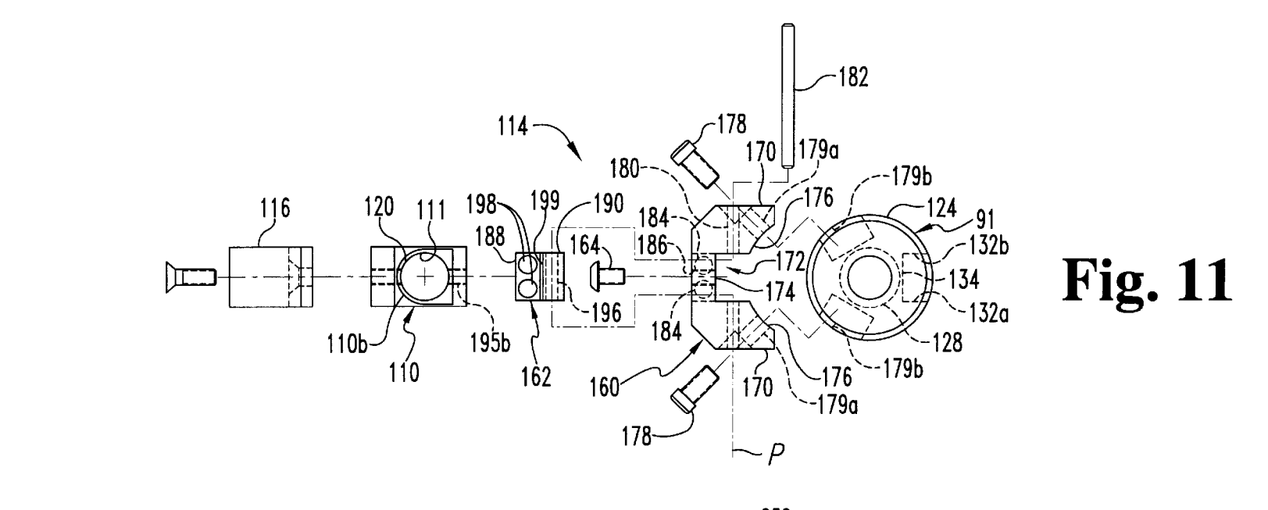
FIG. 11 is an exploded top view of a pivotal portion of the parts delivery conduit shown in FIG. 9, as coupled to an outer housing of the device by a pivoting mechanism.

Referring now to FIGS. 9 and 11, shown therein are further details regarding pivoting mechanism 114. Pivoting mechanism 114 generally comprises a base 160, a pivot lever 162, a pivot adjustment screw 164, and a pair of biasing springs 166 (only one being shown in FIG. 9).

Base 160 generally includes a pair of flange portions 170, spaced apart to define a passage 172 therebetween and interconnected by a bridge portion 174. Each flange portion 170 has a curved inner surface 176 corresponding to the outer surface of the cylindrical upper section 124 of support member 91. Base 170 is attached to support member 91 by a pair of threaded fasteners 178, each passing through an opening 179a in flange portion 170, an opening 179b in cylindrical upper section 124, and threading into a threaded opening 179c in housing 30. An aperture 180 is defined through each flange portion 170 and is sized to accept a pivot pin 182 therein. A lower surface of the bridge portion 174 defines a pair of spring pockets 184, each being sized to receive a respective biasing spring 166 therein. The bridge portion 174 also defines a threaded opening 186 extending therethrough and adapted to threadingly receive the pivot adjustment screw 164 therein.

Pivot lever 162 generally includes a mounting portion 188 and a stem portion 190 projecting therefrom. Mounting portion 188 defines a recess 192 sized to receive a projecting portion 193 of the movable portion 110 of parts delivery conduit 26 therein. Mounting portion 188 is mounted to the projecting portion 193 by a threaded fastener 194 passing through an opening 195a in mounting portion 188 and threading into a threaded opening 195b in projecting portion 193. An aperture 196 is defined through stem portion 190 and is sized to allow the pivot pin 182 to pass therethrough. An upper surface of the mounting portion 188 defines a pair of spring pockets 198, each being sized to receive a respective biasing spring 166 therein.

Pivot lever 162 is pivotally attached to base 160 by first positioning stem portion 190 within the passage 172 between flange portions 170 and then inserting the pivot pin 182 through the apertures 180, 196. Pivot lever 162 is thereby allowed to freely pivot relative to base 160 about pivot axis P (see FIG. 3). The biasing springs 166 are positioned within the spring pockets 184 of base 160 and within spring pockets 198 of pivot lever arm 162 to bias the movable portion 110 of parts delivery conduit 26 toward its first operational position (shown in solid lines in FIG. 3). The pivot adjustment screw 164 is threaded through threaded opening 186 in bridge portion 174 and into contact with a rear bearing surface 199 of stem portion 190. The precise positioning of the first operational position of movable portion 110 can thereby be adjusted by threading pivot adjustment screw 164 into and out of threaded opening 186. It should now be apparent that when the movable portion 110 is pivoted toward the second operational position (shown in phantom in FIG. 3), the biasing springs 166 will be compressed between the spring pockets 184 of base 160 and spring pockets 198 of pivot lever 162. When movable portion 110 is released, the resilient nature of the biasing springs 166 will return the movable portion 110 to its first operational position.

Figure 12:
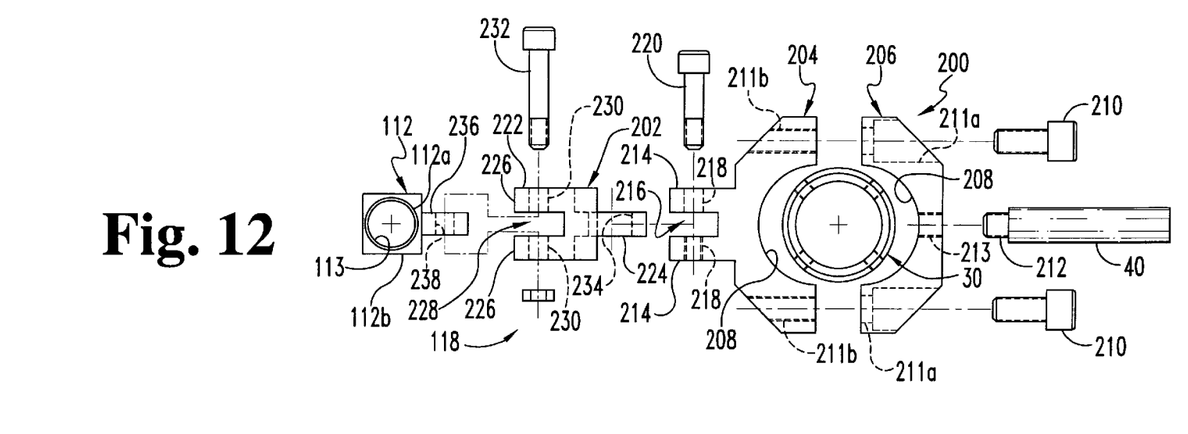
FIG. 12 is an exploded top view of a stationary portion of the parts delivery conduit shown in FIG. 9, as coupled to an outer-housing of the device by a linkage mechanism.

Referring now to FIGS. 9 and 12, shown therein are further details regarding the linkage mechanism 118. Linkage mechanism 118 generally comprises a clamp assembly 200 and a link 202 pivotally attached to both the clamp assembly 200 and the stationary portion 112 of parts delivery conduit 26, the details of which will be discussed below.

Clamp assembly 200 includes a pair of C-shaped clamp portions 204, 206, each defining a curved inner surface 208 corresponding to the outer surface of outer housing 30. Clamp assembly 200 is coupled to outer housing 30 by a pair of threaded fasteners 210, each passing through an opening 211a in clamp portion 206 and threading into a threaded opening 211b in clamp portion 204. By tightening fasteners 210, the C-shaped clamp portions 204, 206 are securely clamped to housing 30, with the curved inner surfaces 208 tightly abutting the outer surface of housing 30. The lower handle 40 includes a threaded stem 212 which is threaded into a threaded opening 213 in clamp portion 206 to operably attach lower handle 40 to clamp assembly 200. Clamp portion 204 includes a pair of opposing flanges 214 extending therefrom and spaced apart to define a passage 216 therebetween. An aperture 218 is defined through each flange 214 and is sized to accept a threaded fastener 220 therethrough.

Link 202 includes a mounting portion 222 and a stem portion 224 projecting therefrom. Mounting portion 222 includes a pair of opposing flanges 226 spaced apart to define a passage 228 therebetween. An aperture 230 is defined through each flange 226 and is sized to accept a pin or fastener 232 therein. A slot 234 is defined through stem portion 224 and is sized to allow the fastener 220 to pass therethrough. The stationary portion 112 of parts delivery conduit 26 includes a stem portion 236 extending therefrom and defining an aperture 238 sized to allow the fastener 232 to pass therethrough.

Link 202 is pivotally attached to clamp assembly 200 by positioning stem portion 224 within the passage 216 of clamp portion 204 and inserting the fastener 220 through the apertures 218 and slot 234. Link 202 is thereby allowed to pivot and translate relative to clamp assembly 200 via the interaction between fastener 220 and slot 234. Link 202 may be locked into a desired position and angular orientation relative to clamp assembly 200 by tightening fastener 220, thereby clamping stem portion 224 tightly between flanges 214. Stationary portion 112 of parts delivery conduit 26 is pivotally attached to link 202 by positioning stem portion 236 within the passage 228 between flanges 226 and inserting the fastener 232 through the apertures 230, 238. Stationary portion 212 may thereby be locked into a desired angular orientation relative to link 202 by tightening fastener 232, thereby clamping stem portion 236 tightly between flanges 226.

It should now be understood that linkage mechanism 118 provides stationary portion 112 with three degrees of adjustment relative to movable portion 110. More particularly, the interaction between clamp assembly 200, link 202 and stationary portion 112 permits the vertical and horizontal position and the angular orientation of stationary portion 112 to be infinitely adjusted relative to movable portion 110. This adjustment feature is particularly advantageous when attempting to align the peripheral edge 122 of stationary portion 112 with the peripheral edge 120 of movable portion 110 to define a substantially continuous parts delivery flow path when movable portion 110 is in its first operational position.

It should also be understood that by providing the parts delivery conduit 26 with a stationary portion 112, the movable portion 110 is allowed to freely pivot without being unduly restrained by the flexible parts delivery tube 48. If the flexible tube 48 were attached directly to movable portion 110, the elastic nature of tube 48 may cause misalignment between movable portion 110 and axial passage 92, possibly resulting in the malfunctioning of device 20. Additionally, since the flexible tube 48 is attached to stationary portion 112, the flexible tube 48 will not experience premature wearing which otherwise might occur if tube 48 were directly exposed to the pivotal movement of movable portion 119.

The operation of device 20 and one embodiment of a method for driving a rivnut 28 into engagement within an opening in a work piece will now be described. However, it should be understood that other methods are also contemplated, and that the steps described below need not necessarily be performed in the order presented.

Multiple rivnuts 28 are initially transported, in bulk form, to a parts feeder device (not shown). The parts feeder device automatically reorients the disoriented rivnuts 28 into a predetermined, uniform orientation. An example of a suitable parts feeder device is illustrated and described in U.S. Pat. No. 5,630,497 to Graham, the contents of which are hereby incorporated by reference. The uniformly oriented rivnuts 28 are then transported, in line form, to an escapement device (not shown). The escapement device automatically segregates the line of rivnuts 28 and delivers the segregated rivnuts 28, one at a time, into the flexible tube 48 (FIG. 1).

Referring now to FIGS. 1–4, the individual rivnuts 28 are thereafter transported through the flexible tube 48 to the automatic driving device 20. In one embodiment, the individual rivnuts 28 are blown through the flexible tube 48 by way of compressed air. However, other means for transporting rivnuts 28 through tube 48 are also contemplated, such as, for example, by gravity. Preferably, the escapement device is actuated by a switch (not shown) on driving device 20 which is activated when the mandrel 32 is in its fully retracted position and nosepiece 24 is in position to receive another rivnut 28.

As discussed above, an individual rivnut 28 is blown through flexible tube 48. The individual rivnut 28 is delivered to the parts delivery conduit 26, passing through flowpath 113 of stationary portion 112 and flowpath 111 of movable portion 110. The movable portion 110 transfers the rivnut 28 through the transverse passage 98 and guides the rivnut 28 into axial passage 92, with the shank 64 extending toward the distal end 24a of the nosepiece 24. The flow of the compressed air is sufficient to propel the rivnut 28 through the first axial portion 92a of axial passage 92 until the seal gasket 66 abuts chamfered portion 94. When jaws 90a, 90b, 90c are in their inwardly biased first configuration, chamfered portion 94 prevents the rivnut 28 from being prematurely discharged from the nosepiece 24. The rivnut 28 is thereby selectively retained within axial passage 92 in a driving position, with the head 62 positioned within axial portion 92a and the shank 64 extending through the axial portion 92b.

The mandrel 32 is then axially displaced in the direction of arrow A and rotated in a first rotational direction about drive axis D, with the rounded end portion 84 of drive shaft 80 guiding drive shaft 80 through the opening 68 in rivnut 28. The external threads 82 of drive shaft 80 are threaded into the internally threaded portion 70 of the shank 64, thereby engaging drive shaft 80 to rivnut 28. As should be apparent, if the external threads 82 and the internally threaded portion 70 each define right hand threads, the first rotational direction will be a clockwise direction.

After drive shaft 80 is securely engaged to rivnut 28, the mandrel 32 is once again axially displaced in the direction of arrow A to discharge rivnut 28 from axial passage 92, with the end 28a of head 62 positioned slightly beyond distal end 24a of nosepiece 24. It should be apparent that as rivnut 28 is axially displaced through passage 92, the outer side wall of head 62 slidably engages axial portion 92b. This sliding engagement pivots and outwardly displaces the jaws 90a, 90b, 90c toward the second configuration (shown in phantom lines in FIG. 4) to permit rivnut 28 to be selectively discharged from nosepiece 24. The outward displacement of jaws 90a, 90b, 90c inwardly compresses the springs 150. Once head 62 is positioned beyond the distal end 24a of nosepiece 24, the biasing force exerted by springs 150 inwardly displaces the jaws 90a, 90b, 90c toward the first configuration.

Figure 13:
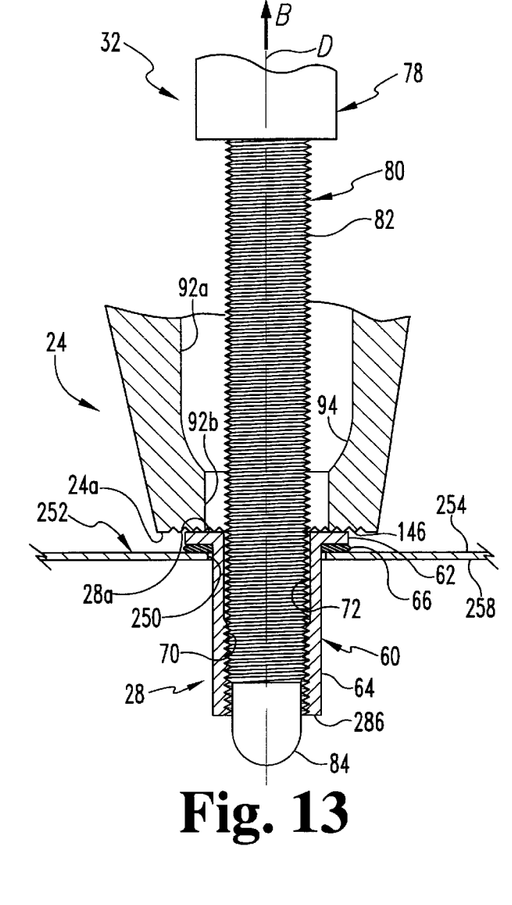
FIG. 13 illustrates an operational position of the device shown in FIG. 1 in which a part is ready to be engaged to a work piece.

Referring now to FIG. 13, the mandrel 32 is axially displaced in the direction of arrow B, with nosepiece 24 remaining in a stationary position, until the end surface 28a of head 62 is tightly compressed against the knurled lower surface 146 of nosepiece 24. The shank 64 is then inserted with an opening 250 in a work piece 252, with the gasket seal 66 placed in abutment and tightly compressed against the upper surface 254 of work piece 252. In one embodiment of the present invention, the work piece 252 is sheet metal and the opening 250 is substantially circular; however, it should be understood that other types of work pieces and other shapes and configurations of openings are also contemplated as would occur to one of ordinary skill in the art.

Figure 14:
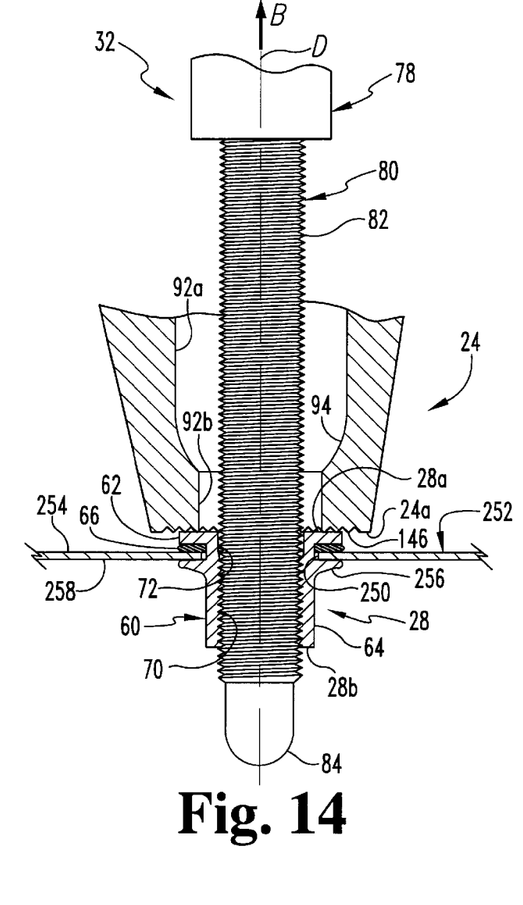
FIG. 14 illustrates an operational position of the device shown in FIG. 1 in which the part is securely engaged to a work piece.

Referring now to FIG. 14, the mandrel 32 is further rotated in the first rotational direction, thereby causing the external threads 82 of drive shaft 80 to thread further into the internally threaded portion 70 of the shank 64. The frictional engagement between the end surface 28a of head 62 and the knurled surface 146 of nosepiece 24 substantially prevents further rotation of the rivnut 28 relative to the nosepiece 24. Thus, as drive shaft 80 is rotated in the first rotational direction, the threaded portion 70 of the shank 64 will be pulled toward the head 62. The resulting axial compressive force causes the relatively thin walled portion 72 of shank 64 to axially collapse or buckle, thereby forming an annular fold or buckled portion 256 adjacent the lower surface 258 of the work piece. Further rotation of the mandrel 32 in the first rotational direction securely engages the work piece 252 between the seal gasket 66 and the buckled portion 256, thereby providing a seal between the rivnut 28 and the work piece 252. Preferably, the resulting seal is watertight.

Once the rivnut 28 is securely engaged to the work piece 252, the mandrel 32 is axially displaced in the direction of arrow B and rotated in a second rotational direction opposite the first rotational direction to unthread the drive shaft 80 from the shank 64 and disengage the mandrel 32 from the rivnut 28. In a preferred embodiment, the drive motor (not shown) which provides the torque necessary to buckle the rivnut 28 is equipped with a torque limit switch, set at a level sufficient to attain proper buckling of rivnut 28. Once the desired torque has been met, activation of the limit switch automatically causes the mandrel 32 to be axially displaced in the direction of arrow B and rotated in the second rotational direction. The drive shaft 80 is then returned to its original axial position (see FIG. 3), wherein the cycling of device 20 continues with the delivery of another rivnut 28 into the axial passage 92.

While the invention has been illustrated and described in detail in the drawings and foregoing description, the same is to be considered as illustrative and not restrictive in character, it being understood that only the preferred embodiment-has been shown and described and that all changes and modifications that come within the spirit of the invention are desired to be protected.

What is claimed is:

1. A device for driving a part, comprising:
   a parts driver having a drive axis;
   a parts receiver including a plurality of retaining elements defining a first passage therebetween extending generally along said drive axis, said plurality of retaining elements being displaceable between a first configuration to retain the part within said first passage and a second configuration to allow the part to be discharged from said first passage, said parts receiver defining a second passage extending transversely therethrough and intersecting said first passage, an adjacent pair of said plurality of retaining elements defining said second passage therebetween; and
   a parts delivery conduit at least partially disposed within said second passage and including an end portion extending into said first passage to guide the part into said first passage.

2. The device of claim 1 wherein said parts receiver comprises at least three of said plurality of retaining elements arranged substantially uniformly about said drive axis.

3. The device of claim 1 wherein said adjacent pair of said plurality of retaining elements defines substantially symmetrical portions of said second passage.

4. The device of claim 1 further comprising means for resiliently biasing said plurality of retaining elements toward said first configuration.

5. The device of claim 1 wherein said end portion is displaceable between a first position in which said end portion extends into said first passage to guide the part into said first passage and a second position in which said end portion is displaced in an outward direction transverse to said drive axis.

6. The device of claim 5 wherein said end portion is pivotable between said first and second positions.

7. The device of claim 5 wherein said conduit includes a stationary end portion disposed proximately adjacent said displaceable end portion to define a substantially continuous parts delivery flowpath when said movable end portion is in said first position.

8. The device of claim 7 wherein said stationary end portion is adapted to connect to a flexible parts delivery tube.

9. The device of claim 1 wherein the part has an overall length and a maximum width, the device being adapted to accommodate a minimum aspect ratio between said overall length and said maximum width of less than about 1.5 to 1.

10. The device of claim 9 wherein the device is adapted to accommodate a minimum aspect ratio between said overall length and said maximum width of about 1.1 to 1.

11. A device for driving a part, comprising:
    a parts driver having a drive axis;
    a nosepiece including at least three jaws defining an axial passage therebetween, said at least three jaws being displaceable between a first configuration to retain the part within said axial passage and a second configuration to allow the part to be discharged from said axial passage, an adjacent pair of said at least three jaws defining a transverse passage therebetween intersecting said axial passage; and
    a parts delivery conduit positioned in communication with said transverse passage to deliver the part through said transverse passage and into said axial passage.

12. The device of claim 11 wherein said conduit is at least partially disposed within said transverse passage.

13. The device of claim 12 wherein said conduit includes an end portion extending into said axial passage to guide the part into said axial passage.

14. The device of claim 11 wherein said conduit includes a movable end portion displaceable between a first position in which said movable end portion is at least partially disposed within said transverse passage and a second position in which said movable end portion is displaced in an outward direction transverse to said drive axis.

15. The device of claim 14 wherein said movable end portion is pivotable between said first and second portions.

16. The device of claim 14 wherein said conduit includes a stationary end portion disposed proximately adjacent said movable end portion to define a substantially continuous parts delivery flowpath when said movable end portion is in said first position.

17. The device of claim 11 wherein each of said adjacent pair of said at least three jaws defines substantially symmetrical portions of said transverse passage.

18. The device of claim 17 wherein said parts receiver comprises three of said jaws arranged uniformly about said drive axis, one of said jaws being arranged generally opposite said transverse passage.

19. The device of claim 11 wherein a distal end of said nosepiece defines an engaging surface adapted to engage a portion of the part to prevent the part from rotating about said drive axis relative to the nosepiece when being driven into engagement with a work piece.

20. The device of claim 19 wherein said engaging surface is knurled.

21. The device of claim 11 wherein said transverse passage is oriented at an oblique angle relative to said drive axis.

22. The device of claim 21 wherein said oblique angle is about 40 degrees.

23. The device of claim 11 wherein each of said at least three jaws is pivotally coupled to a support member, said support member being coupled to said parts driver, at least one spring being disposed between said support member and a respective one of each of said jaws to bias said jaws toward said first configuration.

24. A device for driving a part, comprising:
a parts driver having a drive axis;
a parts receiver defining an axial passage extending generally along said drive axis and a transverse passage intersecting said axial passage; and
a parts delivery conduit including a movable portion displaceable between a first position in which said movable portion is positioned in communication with said transverse passage to deliver the part through said transverse passage and into said axial passage and a second position in which said movable portion is displaced in an outward direction transverse to said drive axis, said movable portion being entirely removed from said transverse passage when in said second position to provide uninhibited access to said parts receiver.

25. A device for driving a part, comprising:
a parts driver having a drive axis;
a parts receiver defining an axial passage extending generally along said drive axis and a transverse passage intersecting said axial passage; and
a parts delivery conduit including a movable portion and a stationary portion, said movable portion being displaceable between a first position in which said movable portion is positioned in communication with said transverse passage to deliver the part through said transverse passage and into said axial passage and a second position in which said movable portion is displaced in an outward direction transverse to said drive axis, said stationary portion being disposed proximately adjacent said movable portion to define a substantially continuous parts delivery flowpath when said movable portion is in said first position; and
wherein said stationary portion is adjustably positionable relative to said movable portion.

26. The device of claim 25 wherein said stationary portion is adapted to connect to a flexible parts delivery tube.

27. A device for driving a part, comprising:
a parts driver having a drive axis;
a parts receiver defining an axial passage extending generally along said drive axis and a transverse passage intersecting said axial passage; and
a parts delivery conduit including a movable portion and a stationary portion, said movable portion being displaceable between a first position in which said movable portion is positioned in communication with said transverse passage to deliver the part through said transverse passage and into said axial passage and a second position in which said movable portion is displaced in an outward direction transverse to said drive axis, said stationary portion being disposed proximately adjacent said movable portion to define a substantially continuous parts delivery flowpath when said movable portion is in said first position; and
wherein said movable portion is pivotable between said first and second positions; and
wherein said movable portion defines a first peripheral edge and said stationary portion defines a second peripheral edge substantially complementary to said first peripheral edge; and
wherein said first peripheral edge is disposed proximately adjacent said second peripheral edge to define said substantially continuous parts delivery pathway when said movable portion is in said first position; and
wherein said first peripheral edge does not interfere with said second peripheral edge when said movable portion is pivoted from said first position toward said second position; and
wherein said first and second peripheral edges are substantially arcuate shaped.

28. The device of claim 24 wherein said movable portion includes an end portion extending into said axial passage when said movable portion is in said first position to aid in guiding the part into said axial passage.

29. A device for driving a part, comprising:
a parts driver having a drive axis;
a parts receiver defining an axial passage extending generally along said drive axis and a transverse passage intersecting said axial passage; and
a parts delivery conduit including a movable portion and a stationary portion, said movable portion being displaceable between a first position in which said movable portion is positioned in communication with said transverse passage to deliver the part through said transverse passage and into said axial passage and a second position in which said movable portion is displaced in an outward direction transverse to said drive axis, said stationary portion being disposed proximately adjacent said movable portion to define a substantially continuous parts delivery flowpath when said movable portion is in said first position; and
wherein said parts receiver includes at least three jaws defining said axial passage therebetween, said at least three jaws being transitionable between a first configuration to retain the part within said axial passage and a second configuration to allow the part to be discharged from said axial passage, an adjacent pair of said at least three jaws defining said transverse passage therebetween.

30. A device for driving a part into engagement with a work piece, comprising:
means for receiving the part, including:
at least three jaws defining a parts drive passage therebetween extending generally along a drive axis, an adjacent pair of said jaws defining a parts inlet passage therebetween in communication with said drive passage; and
means for biasing said jaws toward one another to enable said plurality of jaws to selectively retain the part within said drive passage in a drive position;
means for delivering the part through said inlet passage and into said drive passage, said delivering means including means for guiding the part into said drive passage, said guiding means being pivotable between a first position in which an end portion of said guiding means is at least partially disposed within said drive passage and a second position in which said end portion of said guiding means is pivoted in an outward direction transverse to said drive axis; and
means for driving the part from said drive passage and into engagement with the work piece.

31. A method for driving a part having a head and an internally threaded shank into engagement within an opening in a work piece, comprising:

providing a parts driver, including:
- a drive shaft extending along a drive axis and defining a threaded portion engageable with the internally threaded shank, the parts driver being adapted to displace the drive shaft generally along the drive axis and to rotate the drive shaft about the drive axis; and
- a receiver defining an axial passage extending generally along the drive axis and opening onto a distal end of the receiver;

delivering a part into the axial passage with the shank extending toward the distal end of the receiver;

engaging the drive shaft to the part;

discharging the part from the axial passage and positioning the head of the part beyond the distal end of the receiver by displacing the drive shaft in a first axial direction;

compressing the head of the part against the distal end of the receiver by displacing the drive shaft in a second axial direction generally opposite the first axial direction to substantially prevent rotation of the part about the drive axis relative to the receiver;

positioning the shank of the part within the opening in the work piece; and threading the threaded portion of the drive shaft along the internally threaded shank by rotating the drive shaft about the drive axis in a first rotational direction, the threading causing a portion of the shank to buckle, the work piece being securely engaged between the head and the buckled portion of the shank.

32. The method of claim 31 further comprising unthreading the threaded portion of the drive shaft from the internally threaded shank by rotating the drive shaft about the drive axis in a second rotational direction opposite the first rotational direction.

33. The method of claim 31 wherein the distal end of the receiver defines a frictional surface; and
  wherein the compressing includes frictionally engaging the head of the part against the frictional surface to substantially prevent rotation of the part about the drive axis relative to the receiver during the threading.

34. The method of claim 33 wherein the distal end of the receiver is knurled to provide the frictional surface.

35. The method of claim 31 wherein the receiver includes at least two jaws positioned about the drive axis and defining the axial passage therebetween; and
  wherein the method further comprises:
    biasing the at least two jaws toward one another to selectively retain the part within the axial passage prior to the discharging;
    displacing the plurality of jaws away from another during the discharging; and
    displacing the plurality of jaws toward one another after the discharging and prior to the compressing.

36. The method of claim 35 wherein the receiver includes at least three jaws, an adjacent pair of the jaws defining a lateral opening in communication with the axial passage, the method further comprising providing a parts delivery conduit extending through the lateral opening and having an end portion extending transversely into the axial passage; and
  wherein the delivering includes transferring the part through the parts delivery conduit and guiding the part into the passage with the end portion.

37. The method of claim 36 wherein the part delivery conduit is pivotable between a first position in which the end portion extends transversely into the axial passage to guide the part into the axial passage and a second position in which the end portion is pivoted in an outward direction transverse to the drive axis.

38. The method of claim 31 wherein the part further includes a gasket disposed about the shank and positioned adjacent the head; and
  wherein the work piece is securely engaged between the gasket and the buckled portion of the shank to provide a seal between the part and the work piece.

39. The method of claim 31 wherein the engaging includes:
  displacing the drive shaft in the first axial direction until the threaded portion of the drive shaft is disposed adjacent the internally threaded shank; and
  rotating the drive shaft about the drive axis in the first rotational direction to threadingly engage the threaded portion to the internally threaded shank.

* * * * *